Aug. 6, 1963     C. W. SCHREIBER     3,100,051

UNIVERSAL AUTOMATIC WARE LOADING MACHINE AND METHOD

Filed Oct. 8, 1959     8 Sheets-Sheet 1

INVENTOR.
CARL W. SCHREIBER
BY
J. R. NELSON &
W. A. SCHAICH
ATTORNEYS

Aug. 6, 1963 C. W. SCHREIBER 3,100,051
UNIVERSAL AUTOMATIC WARE LOADING MACHINE AND METHOD
Filed Oct. 8, 1959 8 Sheets-Sheet 5

INVENTOR.
CARL W. SCHREIBER
BY
J. R. NELSON &
W. A. SCHAICH
ATTORNEYS

Aug. 6, 1963   C. W. SCHREIBER   3,100,051
UNIVERSAL AUTOMATIC WARE LOADING MACHINE AND METHOD
Filed Oct. 8, 1959   8 Sheets-Sheet 6

INVENTOR.
CARL W. SCHREIBER
BY J. R. NELSON &
W. A. SCHAICH
ATTORNEYS

Aug. 6, 1963  C. W. SCHREIBER  3,100,051
UNIVERSAL AUTOMATIC WARE LOADING MACHINE AND METHOD
Filed Oct. 8, 1959  8 Sheets-Sheet 8

INVENTOR.
CARL W. SCHREIBER
BY J. R. NELSON &
W. A. SCHAICH
ATTORNEYS

United States Patent Office 3,100,051
Patented Aug. 6, 1963

3,100,051
UNIVERSAL AUTOMATIC WARE LOADING MACHINE AND METHOD
Carl W. Schreiber, Toledo, Ohio, assignor to Owens-Illinois Glass Company, a corporation of Ohio
Filed Oct. 8, 1959, Ser. No. 845,262
10 Claims. (Cl. 214—1)

The present invention relates to method and apparatus for loading glassware delivered from a forming machine to a rotary machine, such as a burn-off machine. The glassware, such as a tumbler, as formed on the forming machine, has an integral excess quantity of glass defining the open end of the article. This excess is known in the art as the moil which is to be later burned off in a burn-off machine, thereby forming the finished rim at the open end of the finished article of glassware.

In the present day manufacture of this glassware, the various types of burn-off machines include a rotary carriage having mounted thereon a series of circumferentially spaced burners. In one type of such machine, there are a number of inverted holding chucks corresponding to the burners which are positioned and aligned above the burners and vertically movable with respect to the burners. The bottom of the ware is placed in the chucks so that the ware is suspended in inverted fashion with the moil lowermost. The chuck is rotated and lowered to insert the moil into the burner to the proper elevation, and the moil is burned off. The finished piece of glassware is then elevated by the chuck and discharged from the machine at a point in the rotary travel of the machine carriage. An example of a burn-off machine utilizing such an arrangement is disclosed in U.S. Patent No. 1,757,211.

Another type of burn-off machine has its chucks in an upright position aligned under overhead burners. The ware with its moil attached is loaded to the chuck in upright fashion and moved into the burner. The moil in this case may be grasped and stretched during severance. An example of this type burn-off chuck arrangement is disclosed in U.S. Patent No. 2,215,980.

Loading the chucks of the burn-off machines has heretofore been performed predominantly by hand transfer. After the ware is formed on the forming machine, it is generally removed from the latter by a rotary take-out apparatus and transferred to a straight line conveyor. This conveyor extends to a region near the location of the burn-off machine. An operator is stationed at this region to remove the ware from the conveyor and transfer it to the chucks of the burn-off machine. The transfer is effected by the operator gripping the ware, usually along its body portion, by a pair of hand-operated tongs. Experience has taught that this type loading causes defects known as "flats" and "tong marks."

There are ware handling machines presently adaptable for loading ware to the burn-off machine, but each of the known machines also possesses several objectionable features. Foremost of these, the ware handling apparatus employs tongs which grip the ware at some point along the body portion. Such apparatus is prone to also cause the aforementioned defects of "flats" and "tong marks," as well as bottom defects. Since the glass is still in a hot state, this handling is capable of imparting surface blemishes, often to the extent of off-ware defects, on a portion of the ware to be in the finished article after burn-off. Also, the machines, in order to keep up with high speed production, employ erratic movements and subject the ware to severe treatment, and do not provide accurate synchronism and registration features for transfer efficiently without jam-up. Accordingly, use of the prior art machines will yield an unusually high rate of off-ware through handling.

It is, therefore, an important object of the invention to provide a fully automatic ware loading method and apparatus for transferring ware traveling in upright position on a horizontal conveyor to the holding chucks of a burn-off machine, and overcome the above objectionable features by effecting a smooth and efficient handling of ware without grasping with the handling apparatus any portion of the ware to be in the finished article after burn-off; whereby, the prior defects arising from hand transfer, especially "flats" and "tong marks," are eliminated, and production efficiency is increased.

It is also among the objects of the present invention to provide a universal ware transfer apparatus which will operate automatically to transfer ware from a horizontal support, such as a conveyor, to the chucks of a burn-off machine, such apparatus, by a relatively simple alteration, being adaptable for use with either of the aforementioned types of burn-off machines. Toward this end, the invention contemplates the provision of a series of ware pick-up devices on a rotary turret which will operate to grip the ware by its moil while in an upright position at a location on the conveyor, herein referred to as a ware receiving or loading station, and simultaneously lift the ware free of the conveyor surface and against a headplate to avoid dragging the bottom of the ware on the conveyor and seat the ware in an axially aligned position. The headplate, which is located slightly above the entering moil end of the ware, prevents the ware from tipping at the time it is picked up from the conveyor. Thereafter, the gripped ware is moved toward the circular path of movement of the chucks on the burn-off machine and registered in vertical alignment with the chuck at a point for placing the ware into a burn-off chuck, this being referred to herein as a ware delivery or unloading station. In an operation where the ware is being loaded to a machine utilizing inverted chucks, the ware is inverted during this movement to the delivery station. The headplate further serves to align the ware for this transfer, and, in the operation where the ware need be inverted, it serves as a resting plate for the ware at the time the jaws release it for pick-up by the chuck.

Another object of the invention is to provide a novel ware handling apparatus which will grip the ware at its moil end, and, concurrently with such gripping, lift the ware free from its support on the moving conveyor and seat it against a headplate to align and support it for subsequent handling.

Another object of the invention is to provide such a ware handling apparatus that is fully adjustable and adaptable to handle various ware sizes.

In the glass plant for manufacture of tumblers, as well as other forms of ware, the ware is formed on the forming machine and transferred to the conveyor. The ware, which is not yet annealed to relieve internal stresses, must then be transferred to the burn-off machine before it cools to the point where it will break easily merely by normal handling contact. Also, the conveyor must be run at a speed that will accommodate unloading the forming machine. To achieve these requirements, the conveyor will need to travel at a rate faster than the linear speed of the ware pick-up mechanism. As one example, if the formed ware is delivered to the conveyor at a center-to-center spacing of approximately 25 inches, which is the normal spacing of ware as delivered from the forming machine, present day burn-off machines are constructed such that the burners and, of course, the chucks which serve them, are normally arranged on the rotary carriage at a center-to-center spacing of somewhat less than 25 inches. This requires that the ware be picked up and delivered to the burn-off chucks at a lesser spacing. Generally, the burners are spaced apart anywhere from nine to fifteen inches.

A still further object of the invention is to provide a novel ware pick-up mechanism and means for operating it for picking up and releasing articles of ware.

Another object of the invention is to provide a ware pick-up mechanism mounted for horizontal movement in a predetermined path, rotary movement about a horizontal axis while moving in said path, and opening and closing movement about an article of ware while moving in that path.

Since the ware pick-up mechanisms are carried on a rotary turret and travel through a circular path, and the chucks on the burn-off machine are carried by a rotary carriage and travel in a separate circular path, the path for the ware on the loader must intersect the path of the chucks to perform the transfer. To effect the smoothest transfer possible, the rotary turret and rotary carriage for the chucks on the burn-off machine are rotated in opposite directions, such as one rotating clockwise and the other counterclockwise. At relatively slow speeds, the transfer to the chucks could be performed by having the loader located so that the circular path of the ware on the pick-up mechanism strikes a tangent point with the circular path of the burn-off chucks. However, the present invention includes as one of its objects the provision for the circular path of ware on the loader overlapping the path of the chucks and altering one of these circular paths to coincide with the other circular path through a portion of the two rotations in proximity to the ware delivery station for transferring the ware from a pick-up mechanism to a chuck. In doing this, it is preferred to shift each ware pick-up mechanism radially on the turret so that the ware that it is carrying will follow in registry for a distance with the circular path of the chuck through the ware delivery station portion of rotary travel of the latter. As the ware and the chuck are held in registry, the chuck is moved vertically to receive and hold the ware while the pick-up mechanism is releasing it.

Having set forth some of the broad objects of the invention, the specific nature of this invention, as well as other objects and advantages thereof, will become apparent to those skilled in the art from the following detailed description, taken in conjunction with the annexed sheets of drawings, on which, by way of preferred example only, is illustrated one practical embodiment of this invention, with two alternative forms of operation.

In its operation, the present invention serves to automatically remove glassware articles from a conveyor and load them into an annular series of revolving burn-off chucks. As was mentioned, to perform this loading, the glassware may need to be turned over or inverted. The mechanism employed to achieved this loading of a moving rotary machine is closely synchronized with the various other units associated with it to go toward making up an entirely automatic glassware shop which accomplishes all of the handling of the articles during manufacture mechanically without detrimental contact on the portion of the article to be in the finished product. To do this in an efficient and rapid manner has been a long sought objective of this industry.

Thus, in operation of such an automatic glassware shop, the ware is delivered from the forming machine and transferred to a straight line conveyor in an upright position. The ware is spaced on the conveyor and moved in such a manner as to obtain the proper cooling prior to handling for burn-off. Thus, as the ware is deposited at a relatively wide spacing and moved at a relatively fast rate on the conveyor, a retarding device is employed momentarily to slow down the ware just at the time it reaches the loading station for pick-up by the ware handling units of the rotary burn-off loader. This retarder positions the bottle accurately with respect to the ware-engaging members on the pick-up mechanism so that each piece of ware may be received by one of these mechanisms and easily grasped. The ware is retarded and positioned to be picked up by jaws on the ware pick-up mechanism, which engage the ware on the moil just under the finish. Since the loader must be closely synchronized with the moving chucks on the rotary burn-off machine, both as to linear speed and position, the loader is driven directly from the burn-off machine, and this drive includes a means for obtaining position synchronization. The section of the moil just under the finish is conventionally formed with a downwardly and inwardly tapered surface that is substantially frusto-conical. As the jaws are caused to close, they have a relatively thin inner facing edge which engages this tapered moil surface, and the closing force causes the ware to be lifted upwardly by the jaws seeking to close on the smallest diameter in that area of the moil taper. Each ware pick-up mechanism has a horizontal headplate spaced to overlie the jaws at pick-up. The rim of the moil will then be lifted to seat against this headplate to position and support the ware in correct alignment for transfer. After the ware has been picked up from the conveyor, the pick-up mechanism may be bodily rotated 180° about a horizontal axis to invert the ware for loading into an inverted chuck on the burn-off. At the time the pick-up mechanism reaches the unloading station, which is the delivery point to the chuck, the ware will have been carried in vertical registration with the opening of the chuck, and the chuck brought down over the bottom end of the ware. About the time the chuck is being lowered, the jaws are opened and the ware is supported on the headplate momentarily. After the ware is fully transferred and loaded to the chuck, the pick-up mechanism and chuck move away from each other, and the pick-up mechanism is again rotated 180° to a position preparatory for picking up another article. During the time when the ware is being loaded to the burn-off chuck during its travel into the ware unloading station, the ware pick-up mechanism is manipulated radially on the turret to cause the ware to follow the same path as the chuck.

Referring now to the drawings, a more detailed description of the invention will be undertaken.

Figure 1:
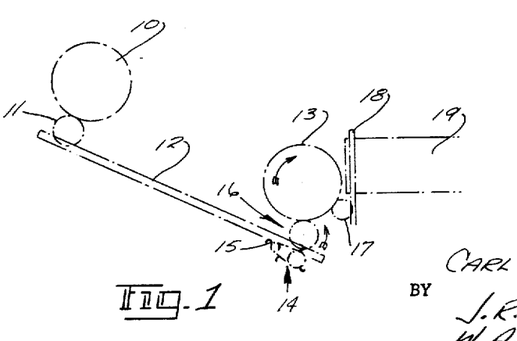
FIG. 1 is a schematic illustration of a fully automatic glassware shop utilizing the present invention.

On FIG. 1, the aforementioned fully automatic shop for producing glassware is shown schematically, including utilization of the present invention. This includes a rotary forming machine 10 which has a plurality of circumferentially spaced ware-forming units or heads which deliver formed ware successively to the transfer arm assembly of a rotary transfer mechanism 11. This mechanism carries the ware over a straight line conveyor 12 which is spaced horizontally from the forming units of machine 10, and has its operating surface in overlying relationship to the transfer arms of the mechanism 11 sufficiently for receiving the ware in an upright position thereon. The ware is deposited successively on conveyor 12 in a predetermined spaced relationship for travel in a single line straight path toward a rotary multiple chuck burn-off machine 13. Intermediate the burn-off machine and the conveyor, the subject matter of the present invention is employed for performing automatic loading of the burn-off machine. By way of a general reference, a ware retarding device 14 is operated along one side of the conveyor 12. This device 14, which is to be presently described more in detail, has a plurality of fingers 15 which are moved in a path extending over the conveyor surface and along the same direction as the ware will travel while on the conveyor 12. The fingers 15 move at a predetermined rate that is slower than the ware movement on the conveyor. The fingers 15 thus act to intercept the ware by momentary contact with it as near its bottom as possible just prior to its transfer from the conveyor, and thereby position and synchronize the ware with the moving ware pick-up mechanisms of the rotary ware loader 16. There are a number of these ware pick-up mechanisms provided on the loader 16, and they each are carried in a circular path that extends over the conveyor 12. The fingers 15 and the ware pick-up mechanisms are timed and synchronized with each other to enable loading the ware at a ware-receiving station or loading station on the conveyor. The loader 16 then transfers the ware to a chuck on the burn-off machine 13, as will be presently described. While on this latter machine, the moil portion of the ware is burned off to finish the article. The finished articles are removed by a take-out mechanism or unloader 17 and transferred onto a lehr cross conveyor 18 from which they are loaded into the lehr 19.

Figure 3:
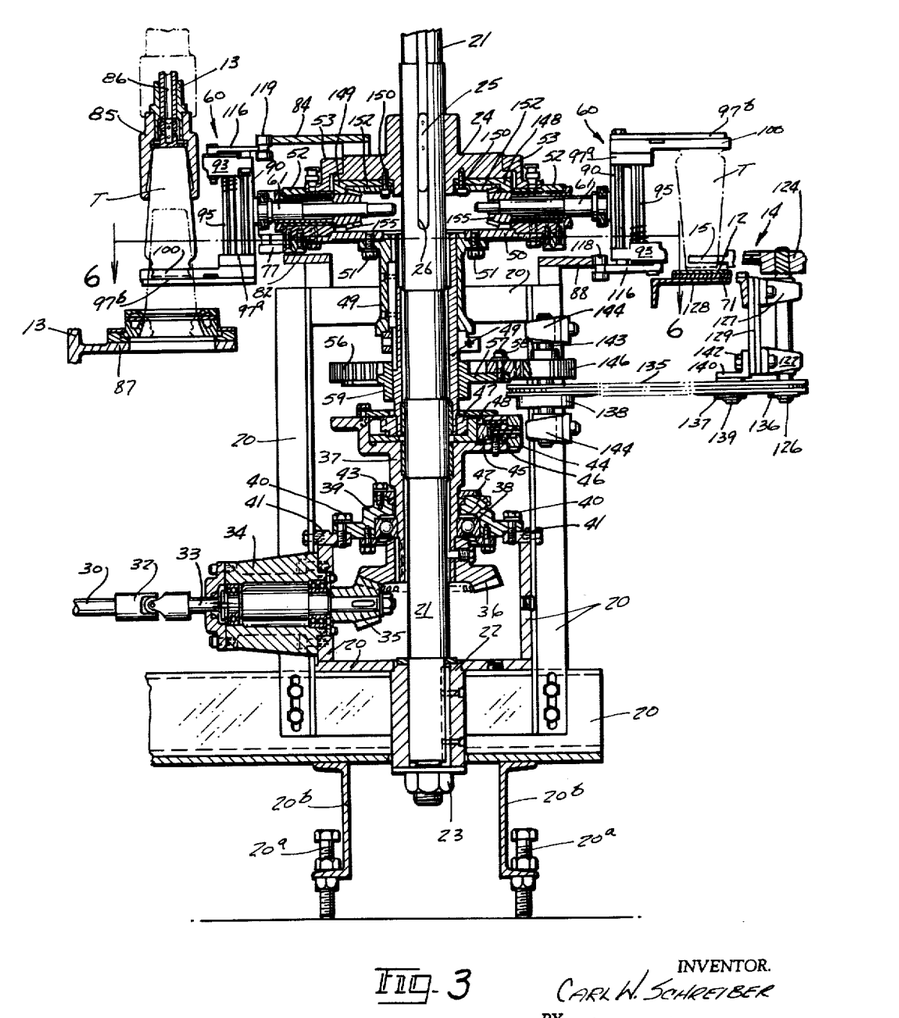
FIG. 3 is a sectional elevational view of the rotary ware loader, as taken along line 3—3 of FIG. 2, and illustrates the operation of the loader for loading inverted chucks on a burn-off machine.

As seen on FIG. 3, the loader 16 comprises a base 20 having leg supports 20a adjustable for height with respect to the floor through their connection with structural members 20b. Near the bottom of the base 20 is a vertical shaft 21 rigidly attached in place at a casting 22 and held by the end nut 23. As another stationary part of the machine, an upper casting 24 is keyed onto the shaft 21 at key 25 in the vertical key slot 26. The casting 24 is held to a selected elevation thereon.

Figure 2:
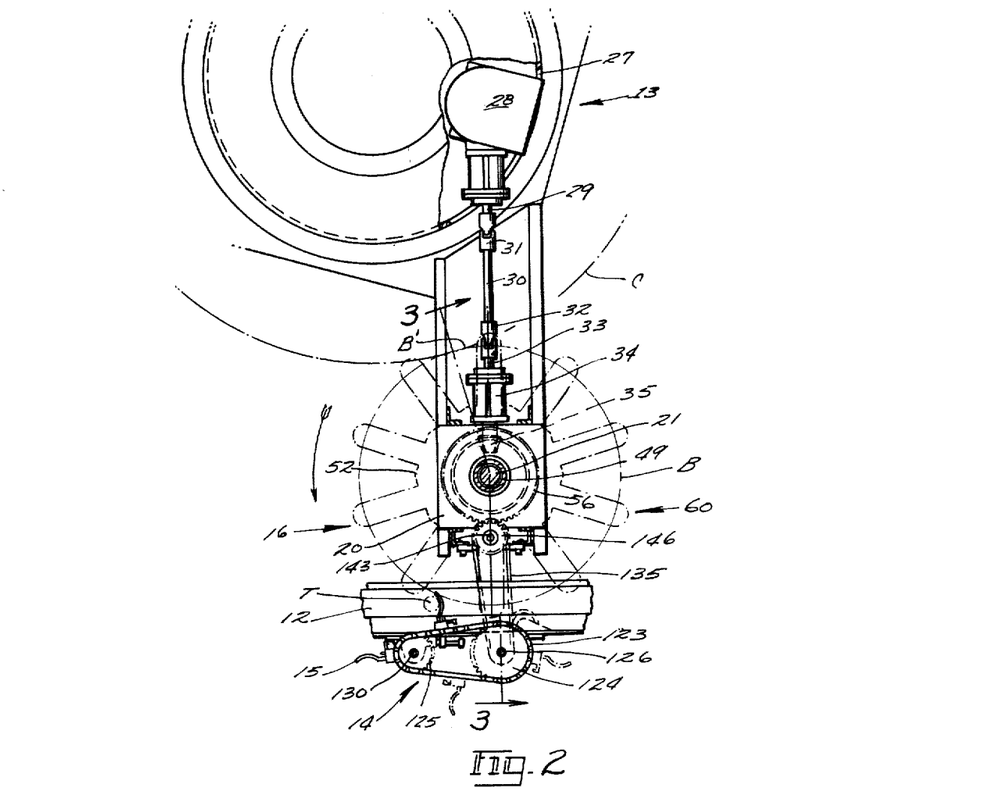
FIG. 2 is a plan view, partly broken away and partially schematic, showing the drive connection between the burn-off machine, the rotary ware loader, and the ware retarder device for synchronizing the movements of all three.

As seen on FIG. 2, the loader 16 is driven by an operative connection between the base bull gear 27 of the burn-off machine and a driven gear (not shown) of transmission unit 28. The transmission unit has an output shaft 29 connected by a coupling 30 and its end universal joint connections 31 and 32 to a stub shaft 33 that is bearing-mounted in the journal box 34. This journal box is rigidly fastened to the base 20 (FIG. 3). Keyed on the opposite end of the stub shaft 33 is bevel drive gear 35. This gear is in meshing engagement with a matching beveled spider 36 rotatably mounted on shaft 21. The spider gear 36 is fastened rigidly with an upper casting which provides an annular driver member 37. These parts 36 and 37 are rotatably mounted in a bearing 38 provided by the annular casting 39 which is bolted to the base 20 by the studs 40 at the integrally fastened side lugs 41. The casting 39 has an upper capped annular flange 42 fastened by a bolt 43.

The annular driver member 37 forms part of a detent clutch and carries one or more detent units 44. Each of these units includes a detent plunger 45 that is forced in a radially inward direction by a spring assembly 46. Fitting concentrically within the annular driver member is an annular driven member 47 which forms another part of the mentioned detent clutch. The driven member 47 is likewise rotatable about the shaft 21 and includes a corresponding number of detent notches 48 capable of receiving the inner end of the detent plungers 45 for normally holding the driven member 47 in engagement with the driver member 37 to be driven thereby. The annular position of the detent plungers engaged in the detent notches of the just described clutch provides for an annular position of the ware pick-up mechanisms of the loader that will be synchronized in space with the chucks of the burn-off machine as these two just mentioned units are rotated at any given rate of rotation of the burn-off bull gear 27 through the just described drive connection to the annular driver member 37. The detent clutch also provides a safety feature for the loader 16. In case of jam-up or interference of the moving parts of the turret, the spring assemblies 46 will yield under a predetermined torque and allow the clutch to slip. Integrally secured with the driven member 47 is an integral sleeve structure 49 which serves as a tubular drive shaft connected to the lower spider 50 of the turret by bolts 51. Both the tubular shaft 49 and the spider 50 are rotatable about the vertical shaft 21.

Figures 8, 9:
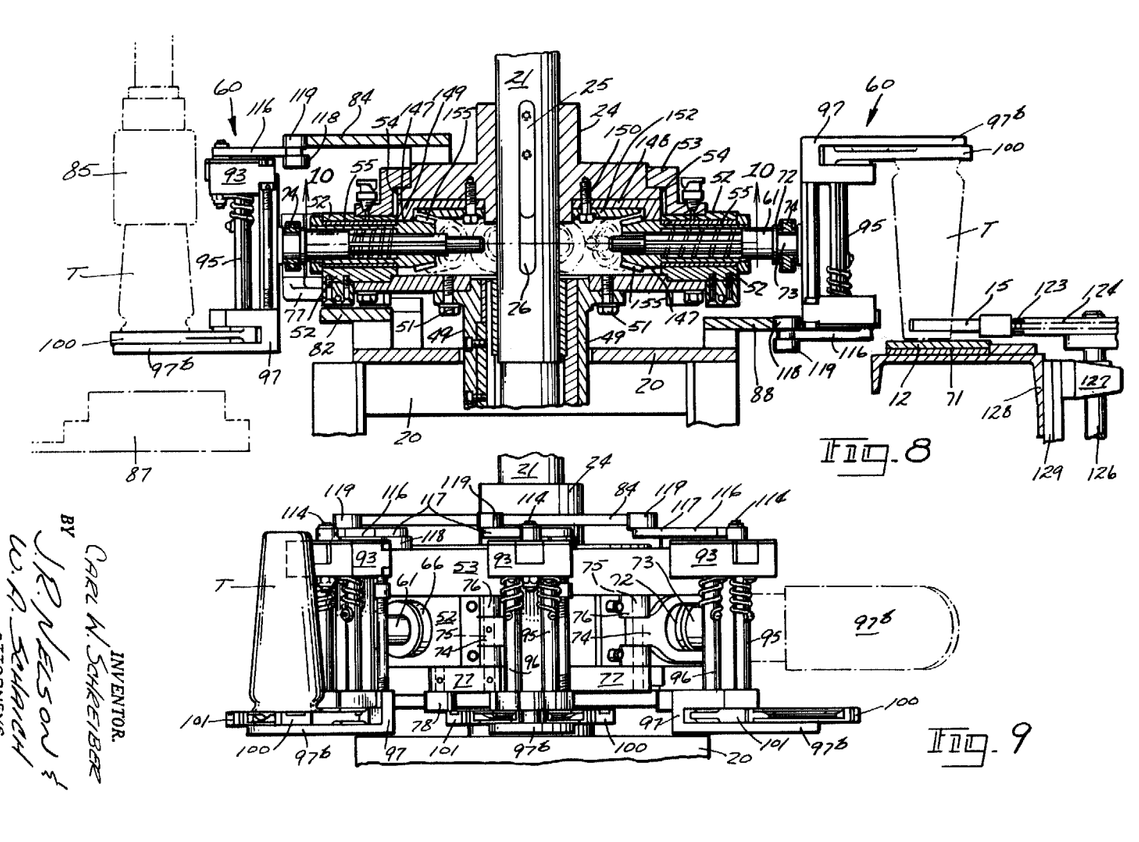
FIG. 8 is an enlarged sectional elevational view of the upper portion of the loader, as was illustrated on FIG. 3.
FIG. 9 is an elevational view of the turret of the rotary loader as it would appear at the delivery station side adjacent the burn-off machine.
Figure 10:
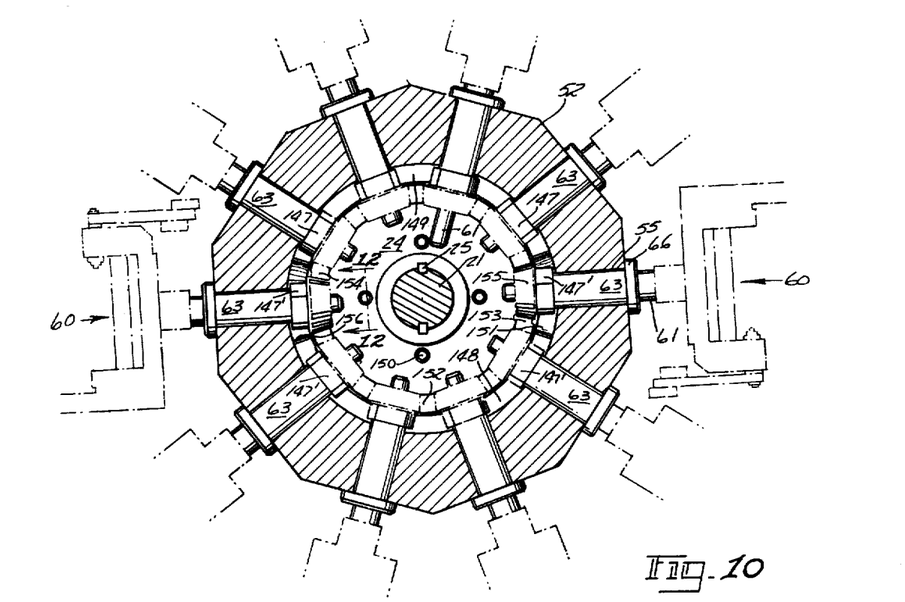
FIG. 10 is a sectional plan view taken along line 10—10 of FIG. 8.

The lower spider 50 forms part of the turret which includes a housing 52. This housing provides radial mountings for the illustrated ten ware pick-up mechanisms, each identified generally by reference numeral 60, spaced equally about the turret (see FIGS. 4, 6, 9, and 10). Integrally connected at its upper side of the housings 52 is an upper annular bearing plate 53. This upper plate is rotatable on the annular radial flange 54 of the casting 24 which is held stationary on the vertical shaft 21 (FIG. 8). Each of the ware pick-up mechanisms 60 is mounted in a bored cylinder 55 of housing 52 in a similar manner (FIG. 10). The mechanism 60 has a shaft 61 journal mounted for radial shifting movement in a bore 62 of the cylindrical sleeve member 63 (see FIG. 11). The sleeve member 63 is rotatably mounted in a bearing 64 held in a cylinder 55 of the housing 52. The sleeve member 63 is radially located by its annular shoulder 65 fitting against the one axial end of the bearing 64 and a threaded collar 66 screwed onto the other end of sleeve member 63. The collar bears against the outer end of the housing 52. The shaft 61 is of varying diameter and has a central portion 61a provided with a plurality of splines 61b assembled in a matching splined bore 67 of the sleeve member 63. This cooperation between the splines 61b and the matching splined bore 67 secures the shaft 61 against rotational movement with respect to the sleeve member 63. The just described mounting of the shaft 61 in the sleeve member 63 provides a radially shiftable mounting for the shaft 61 on the turret. The larger outer end portion of the shaft 61 forms a shoulder 68. The inner end of the bore 62 in member 63 forms a shoulder 69. A coil spring 70 is compressible between the shoulders 68 and 69 to normally urge the shaft 61 radially outwardly in its mounting in the sleeve member 63.

Figure 6:
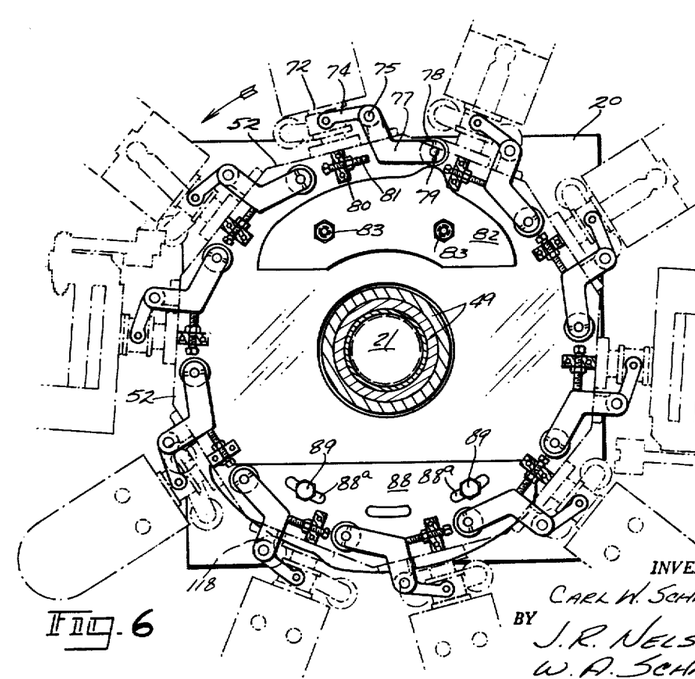
FIG. 6 is a sectional plan view taken along line 6—6 of FIG. 3.
Figures 18, 19:
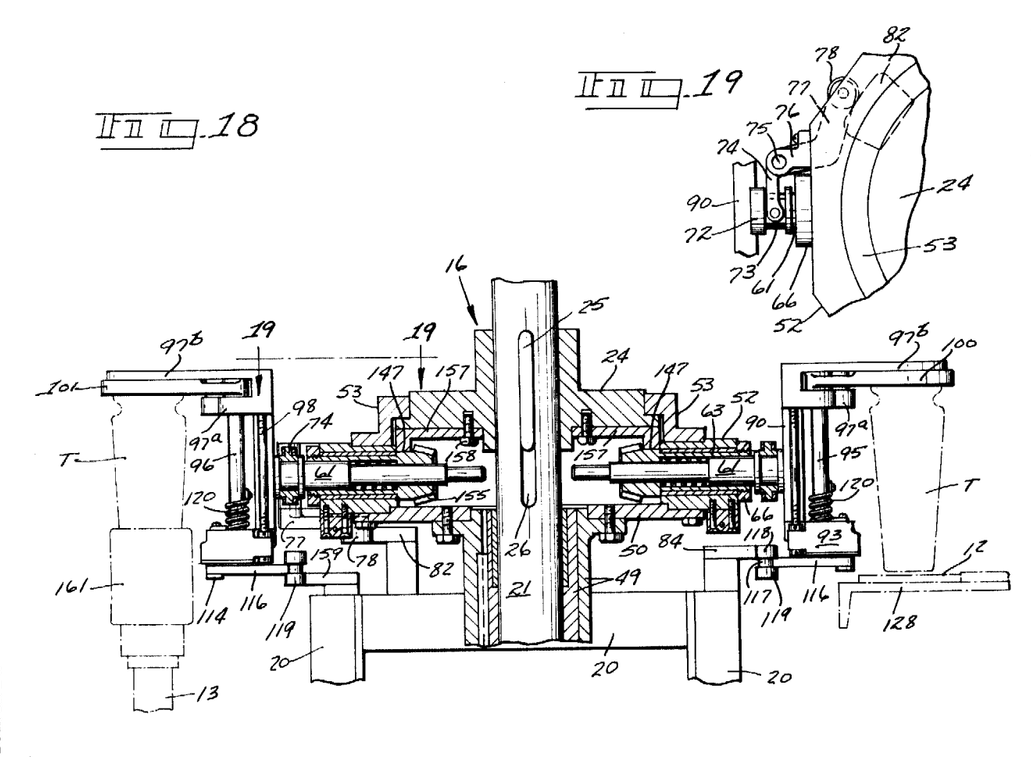
FIG. 18 is a sectional elevational view of the turret of the rotary loader, which illustrates it adapted to a second form of operation under the present invention.
FIG. 19 is a detailed plan view taken along line 19—19 of FIG. 18.

Referring now to FIGS. 6, 9, and 19, each shaft 61 has a pressed-on collar 72 formed with an annular raceway in the form of a groove 73. A yoke 74 rides in the groove 73 and is pivotally mounted on a pin 75 for rotation therewith. Pivotal movement of the yoke 74 thus transmits an axial force to shaft 61 at its collar 72. The pin 75 is rotatably mounted in a bracket 76 fastened to the housing 52 at the periphery of the turret. The lower end of pin 75 carries an arm 77 attached to drive the pin. At the outer end of arm 77 is a rotatable roller 78 attached by pivot pin 79. The roller 78 acts as a cam follower. As was described in connection with FIG. 11, the shaft 61 is normally under force for radial extension by the compressed coil spring 70. The normal extended position of each pick-up mechanism 60 is defined by a stop member which comprises a bracket 80 fastened to the turret and an adjusting screw 81 threaded therethrough in a position to engage the side of the arm 77. As shown on FIG. 6, as the units 60 are urged outwardly by their spring 70, the yoke 74 is carried in the groove 73 to urge it outwardly and pivot the pin 75 in a clockwise direction (FIG. 6), thus rotating the arm 77 in that direction. This rotation is permitted until the arm 77 engages the end of the adjusting screw 81 which stops the extension of the unit 60 and defines its normally extended position. As the turret is rotated in the counterclockwise direction, indicated by the arrow on FIG. 6, the cam follower 78 engages the rise on a cam 82. This cam 82 is held stationary by fastening it at bolts 83 on the base 20. As the roller 78 engages the rise of the cam, the arm 77 is forced in a counterclockwise direction, which drives the pin 75 and yoke 74 in that same direction, and forces the unit 60 radially inwardly to retract it under control of the cam 82. This cam is developed and located on the base 20 in proper position to cause the piece of ware carried by the unit 60 to follow a selected path the same as the path of a chuck on the rotary carriage of the rotary machine which it is to serve. Thus, with the unit 60 normally held in its extended position, the ware is normally carried in a regular circular path B until that path approaches a point of intersection with the circular path C of the chuck on the rotary machine. At this point, the cam 82 will operate the lever means comprised of the parts 77, 75, and 74, so as to alter this circular path of the ware as B' which will coincide with the circular path of the chuck. As the paths coincide and the ware and the chuck are in registry, the transfer of the ware from the unit 60 to the chuck may be carried out. A shown on FIG. 3, this transfer occurs at a ware unloading station at which a burn-off chuck 85 is lowered from the phantom outline position to the solid outline over the base of the tumbler T. With the tumbler T received therein, vacuum is applied to the chuck 85 through the passage 86, which will hold the ware thereon. At the time the chuck is being lowered over the tumbler, the tumbler handling device 60 is being operated to release the tumbler. As shown on the drawing, the tumbler subsequently travels in the circular path of the chuck 85 of the rotary machine, and the chuck is later actuated to lower the tumbler into an annular underlying burner 87 on the rotary carriage of the burn-off machine 13. While in this position, the tumbler is rotated and the annular flame burns off the moil portion of the ware.

The article handling devices 60 each comprise a ware pick-up mechanism shown in detail on FIGS. 13–17. Each unit 60 has a frame 90. The frame 90 is fastened to an integral plate 91 at the outer end of the shaft 61 by a cap screw 92. The frame 90 is recessed to fit around the square plate 91 so that it is held securely against rotation with respect to the shaft. The upper end of the frame 90 provides an integral housing 93 having a pair of side-by-side holes 94 which receive two vertically disposed shafts 95 and 96. A headplate member 97 fits around the other end of the frame 90 in a dovetail slidable mounting, and is held in position by an adjusting screw 98 threaded into the headplate member 97 near one end and into the upper casting 93 of the frame at its other end. This adjusting screw mounting permits varying the location of the headplate 97 by sliding it along the frame 90. The headplate member 97 also has a pair of bored holes 99 aligned with the holes 94 to accommodate the shafts 95 and 96. Thus, the shafts are mounted parallel for rotation on the frame of the unit. Opposed gripping jaws 100 and 101 are keyed onto the shafts 95 and 96, respectively. Each of the ware gripping jaws comprises arms 100a and 101a and jaw inserts 100b and 101b. The inserts are detachably connected to these arms by cap screws 102. The inserts have a thin arcuate inner facing edge surface 103 that may be closed about the ware and engage its sides in picking it up for loading it to the ware pick-up mechanism. As shown on FIGS. 13 and 14, the inserts are chamfered toward the surface 103 as at 104. The inserts are changeable to suit the diameter of the articles selected to be handled.

Figures 13, 16:
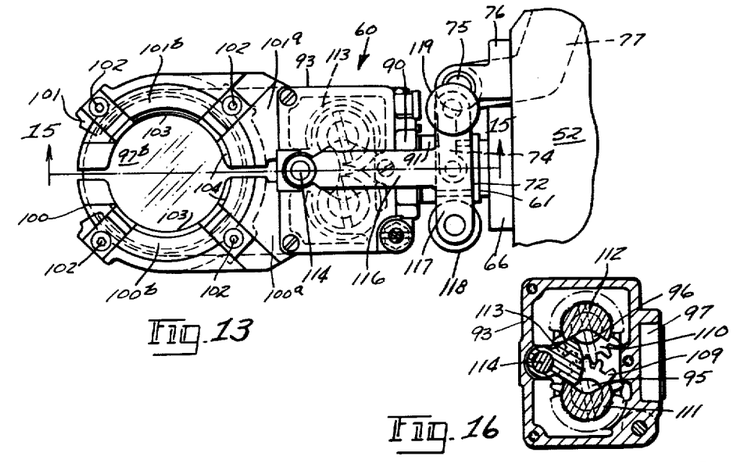
FIG. 13 is a plan view of one of the ware pick-up mechanisms of the invention mounted on the rotatable turret of the rotary loader, shown as it would appear in position for holding ware inverted on the loader.
FIG. 16 is a sectional plan view taken along line 16—16 of FIG. 15.
Figures 14, 15, 17:
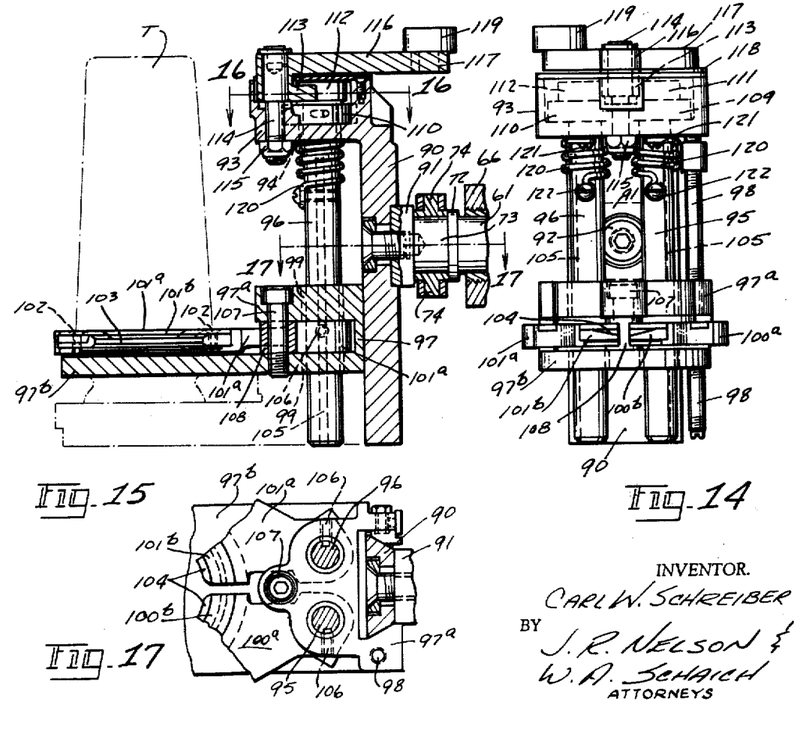
FIG. 14 is an end elevational view of the ware pick-up mechanism of FIG. 13.
FIG. 15 is a sectional elevational view taken along line 15—15 of FIG. 13.
FIG. 17 is a sectional plan view taken along line 17—17 of FIG. 15.

The arms 100a and 101a are journaled about their shafts 95 and 96 and held between the boss 97a and the horizontal headplate 97b, both rigidly supported by the headplate member 97. The member 97, as was previously mentioned, as well as the two arms 100a and 101a, is slidable axially along the shafts 95 and 96, respectively, by the adjusting screw 98. The arms are fastened to the shafts so as to be rotatable thereby by a set screw 106 in an axial keyway 105. The boss 97a is bolted to the headplate 97b at bolt 107, which extends through a spacer 108 held therebetween. Thus, the jaws and headplate may be adjusted along the frame 90 to accommodate various sizes of ware.

The upper ends of the shafts 95 and 96 each have a gear 109 and 110 keyed onto them, the two gears being constructed so as to be in meshing engagement with each other. Cam followers 111 and 112 are rigidly fastened to the shafts 95 and 96, respectively, at a point axially beyond the gears 109 and 110. These cams constitute drivable members on each of the shafts and are disposed in a cooperating relationship to permit counter revolutions of the shafts upon actuation by a cam 113. This cam 113 constitutes a driver member and is journaled about a pin 114 extending through housing 93 fastened by nut 115 (FIG. 15). The cam 113 has an integral lever arm 116 which has an integrally attached cross bar 117. The cross bar mounts a pair of cam followers in the form of rollers 118 and 119, these two rollers being disposed on opposite sides of the cross bar 117. These two cam followers will be engageable, one at a time, with different cams mounted on the machine for rotating the lever 116 in one direction or the other about the pivot 114. This will impart rotation to the cam 113, which will drive one or the other of the cam followers 111 or 112. If, for example, the cam 113 is rotated in the clockwise direction in FIG. 16, it will drive the cam follower 111 in the counterclockwise direction, causing its gear 109 to drive gear 110 and its shaft 96 in the clockwise direction. This rotation of the two shafts will rotate the ware gripping jaws 100 and 101 in opposite directions for opening them. The contoured shape of the cam follower 112 will permit this rotation. Counterclockwise rotation of cam 113 will produce the same opening movement of the jaws by driving cam follower 112 and shaft 96 clockwise, which will rotate gear 110 to drive gear 109 and its shaft 95 counterclockwise.

The gripping jaws 100 and 101 are forced toward each other to the closed position by similar torsion springs 120, oppositely wound and mounted, which work on their respective shafts 95 and 96 oppositely one to the other. The one end of each spring is fastened to the underside of housing 93 by a screw fastener 121. The other end of each of the coils of the springs 120 is fastened onto the respective shafts 95 and 96 by a screw fastener 122. This provides a resilient means for normally urging the gripping jaws into their closed position, and the springs have sufficient torsional torque effect upon the shafts to hold the jaws in closed position for loading and supporting an article of ware on each of the units 60 by a manner to be presently described.

As previously mentioned, the units 60 are mounted for carriage by the rotation of the turret about the vertical axis 21. As shown on FIG. 4, the base 20 of the loader 16 is situated with respect to conveyor 12 and the burn-off machine 13 so that the jaws 100 and 101 of each of the ware handling devices 60 intersect the path of the upright articles T at a tangent point to that path over the conveyor. At this time, the units 60 are held in their radially extended positions by the arm 77 of each being engaged against the stop 81 (FIG. 6). The straight path of the center of the articles T is indicated at A. The path of the center of the jaws is a circle indicated at B. As the articles T approach the loading station on the conveyor, the ywill engage a ware retarder finger 15 of the ware retarder device 14. At about this point, the conveyor belt 12 runs over an inclined pad 71 which elevates the tumbler (FIG. 5).

As seen on FIGS. 2, 5, and 8, this device is constructed as follows: An endless carriage in the form of a roller chain 123 is engaged on the teeth of sprockets 124 and 125. Sprocket 124 is keyed onto vertical shaft 126 that is bearing-mounted in brackets 127. The brackets 127 are rigidly attached to the side of the conveyor frame 128 at the structural reinforcing plate 129. The sprocket 125 is keyed onto vertical shaft 130 bearing-mounted in brackets 131. The brackets 131 are retained for horizontal sliding movement along the structure 129, and adjusted by the screw elements 132 threaded through bracket 133 which is rigidly attached to the structure 129. By this means, the carriage chain may be properly tightened. The fingers 15 are mounted onto links of the chain 123 by suitable slide mounts 134. These permit forward and rearward adjustment of the position of each finger 15 with respect to the others. Preferably, the fingers are carried at an elevation such that they will engage the ware on conveyor 12 as near their bottom end as may be practical. As shown on FIGS. 3, 5, and 8, they are carried at a height so as to engage the side of the tumblers illustrated near the "sham" section. This will decrease any tendency to tip the ware. Also, this region of the ware is the least sensitive to deformity. The fingers 15 are of a length to project across the conveyor 12 and intercept articles moving along path A. The fingers 15 have a covering of asbestos material on the ware-engaging side to reduce chilling effect and provide a cushioned surface on contact with the glass.

The carriage is driven by a chain drive 135 (FIGS. 3 and 5) running on a sprocket 136 attached at the lower end of shaft 126 by set screw 145. The chain engages an idler gear 137 and a drive sprocket 138. The idler gear is rotatable on a shaft 139 that is held in a horizontally slidable bracket 140. The bracket 140 is adjustably mounted by its slots 141 and bolts 142 onto vertical structure 129 on the conveyor. The drive sprocket 138 is keyed on a shaft 143 journal-mounted in bearing mounts 144 attached on the vertical member of base 20. Shaft 143 is driven by the pinion 146 keyed thereon in mesh with an annular gear 56. This gear is bolted to a spider 57 by a bolt 58. The hub 59 of spider 57 is rigidly attached to the sleeve member of the tubular drive shaft 49. This drive off the shaft 49 has a predetermined gear ratio for moving the fingers 15 on the chain carriage 123 at the same linear speed as the centers of the jaws while traveling on path B. The fingers may be adjustably timed for engaging the ware on the conveyor as desired by loosening the set screw 145 holding the sprocket 136 to shaft 126 and rotating the chain to advance or retard it. The fingers 15 should make contact with the ware at about the time the jaws 100 and 101 of the units 60 begin closing. This closing of the jaws for loading ware will be presently described. When the position of the fingers is thus synchronized with the ware-handling jaws, the set screw 145 is secured to lock the drive connection in place.

The units 60 are loaded at the loading station as they are moved over the conveyor 12 by opening their gripping jaws 100 and 101 by the cam roller 118 of each rolling on the cam 88 which is a plate cam bolted by studs 89 on the base 20 (FIG. 6). The position of the cam may be adjusted to time the jaw opening by adjustment along slots 88a. Cam 88 is developed so rollers 118 will successively actuate the jaws to their open position as each unit 60 is carried toward the conveyor (see FIG. 4). Thence, the cam will permit the jaws to close about the moil of the tumbler T at a point about 10° of rotation before the tangent point P is reached. It is preferred that the cam 88 provide for rapid closing movement of the jaws for loading. In picking up the ware, the jaws 100 and 101 are kept open until the article is about to come under control of a retarder finger 15 and be brought between the jaws by the convergent movement of the unit 60 and the articles. At about this point, the incline of the conveyor 12 going over pad 71 occurs to elevate the article and place the moil well within the bite of the jaws, whereupon the cam 88 permits the jaws to immediately close under force of their springs 120. The retarder finger 15 actually need contact the ware for but a fraction of a second before the jaws are closed on the moil. Upon closing, the jaws engage the moil of the ware just under the top rim. Below this point, the moil is tapered inwardly and the continued closing force of the thin arcuate engaging edge 103 of each of the jaws lifts the ware bodily toward the overlying horizontal headplate 97b. The rim of the ware seats on this plate and the jaws hold the ware in upright suspended fashion. This will have occurred by the time the unit 60 and the ware have reached the point of divergence between it and the conveyor (path A) beyond the tangent point P. With the bottom of the article free of the conveyor 12, the circular path B may be followed toward the ware unloading station at the burn-off machine without dragging the bottom of the ware on the conveyor. Meanwhile, the conveyor 12 is running off the inclined pad 71. This will further separate it from the bottom surface of the ware. As indicated on FIG. 4, the carriage of the burn-off ascribes to its chucks a circular path C. Under this, the first form of operation of the invention, the units 60 are made to invert by rotation about the radial axis of the mounting shaft 61 prior to reaching the unloading station. This invert is performed in the following manner.

Figure 11:
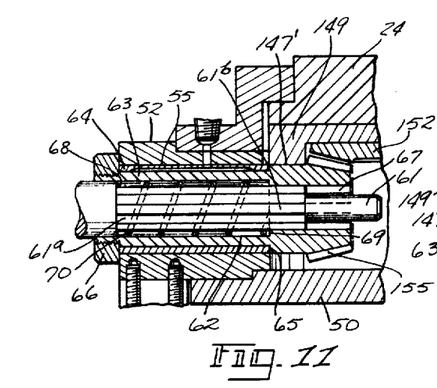
FIG. 11 is a detailed sectional elevational view of one of the mountings for the ware pick-up mechanisms on the turret of the rotary loader.
Figure 12:
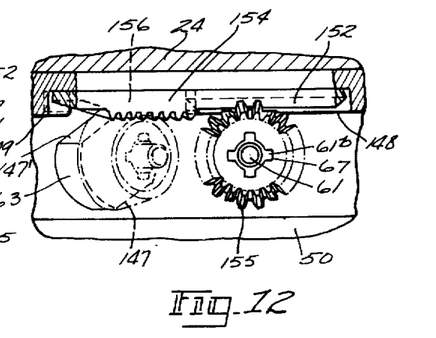
FIG. 12 is a detailed sectional elevational view taken along line 12—12 of FIG. 10.

As was earlier described herein, each unit 60 is rotatably mounted by its shaft 61 and cylindrical sleeve member 63 in the bored cylinders 55 of the turret housing 52. The units 60 are retained in position so that their jaws 100 and 101 are held horizontal by having horizontal diametrically opposed flats 147 147' milled on an axial portion of sleeve member 63 (FIGS. 10–12). Guide plates in the form of complementary substantially semiannular guide plate segments 148 and 149 (FIG. 10) are bolted in position to the underside of stationary upper casting 24 at bolts 150 (FIGS. 3 and 8). The guide plate 148 is arranged to engage the flat 147 uppermost on the sleeve member 63 when the jaws 100 and 101 of the units 60 are horizontal and in position to pick up tumblers T in upright position by grasping them while on conveyor 12. This slide bearing relationship between the plate 148 and flat 147 will hold the sleeve member 63 fixed in this position against rotation prior to and during rotary movement for ware pick-up at the loading station and until a point in that movement intermediate the ware loading and unloading stations. Then the plate 148 terminates to form a recessed region 151, whereat flat 147 is disengaged, thereby permitting rotation of the sleeve member 63 (FIG. 10). An annular plate 152 having a lesser radius than the guides 148 and 149 is provided with two arcuate horizontal bevel gear segments 153 and 154 that are facing downwardly. These segments are positioned to engage the bevel gears 155 formed integral at the inner end of the sleeve members 63. The segment 153 is of sufficient length to impart one-half revolution to each gear 155 as the flat 147 enters the recessed region 151 between guide plates 148 and 149 permitting rotation. Thus, as the turret is powered to rotate about the center shaft 21, each pick-up mechanism 60, after being loaded with a piece of ware, will invert to carry the ware to the unloading station in inverted fashion so that the headplate 97b of the ware-handling apparatus is lowermost. As the segment 153 terminates, likewise does recessed region 151, and the other flat 147' will ride on the next guide plate 149. This will hold the unit 60 inverted throughout the ware unloading station along the burn-off machine path C.

As the units 60 are each carried beyond the unloading station and back toward the loading station, the flat 147' thereon enters the next recessed region 156, and the beveled gear 155 there engages the straight beveled gear segment 154 to impart one-half revolution to the sleeve member 63. This reverts the unit to upright position for picking up another piece of ware from the conveyor. After the one-half revolution is completed, the unit is held in position for ware pick-up by the flat 147 of the sleeve member 63 again riding on guide plate 148.

Figure 4:
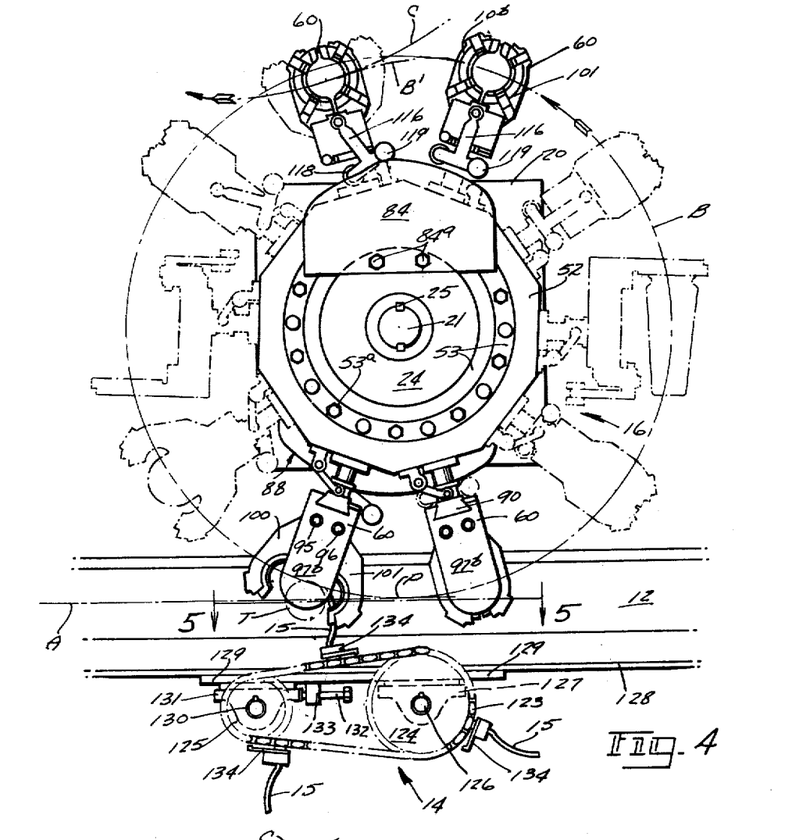
FIG. 4 is a plan view of the ware loader, ware retarder, and straight line conveyor, illustrating the one form of the invention for loading ware from the conveyor to inverted burn-off chucks.
Figure 5:
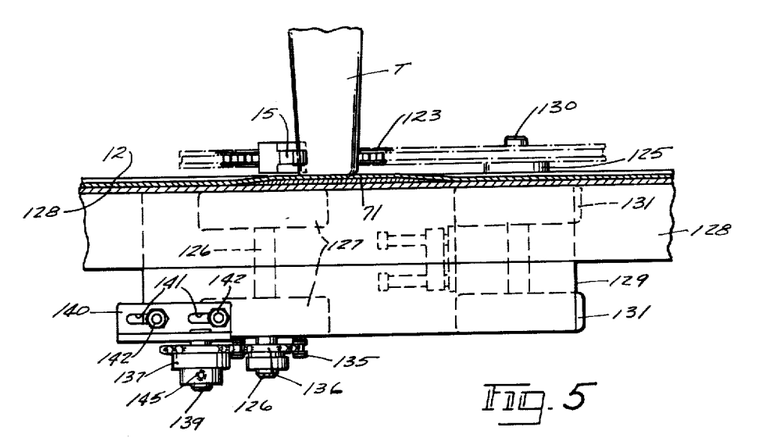
FIG. 5 is a sectional elevational view taken along line 5—5 of FIG. 4.
Figure 7:
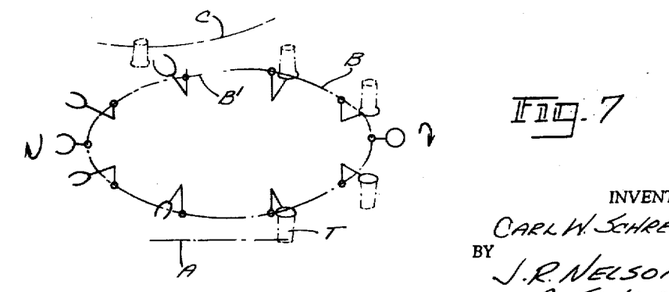
FIG. 7 is a schematic diagram illustrating the invention for loading ware picked up in an upright position and inverted during transfer to the delivery point.

Thus, the ware pick-up mechanisms are each loaded in the manner described above during movement of each unit 60 through the ware loading station in path B (FIG. 4). The ware is loaded in upright position under influence of the loading cam 88 operating the cam roller 118 and lever 116 responsive to rotary motion of the turret. The ware is then carried while the unit 60 undergoes 180° of rotation about its axis along shaft 61 to place the ware in inverted position. As the circular movement in path B continues, this path reaches a point of intersection with the circular path C of the chucks on the rotary burn-off machine carriage. As was earlier described, the units 60 and a chuck 85 are synchronized to meet at this point in vertical alignment. At this intersection, the bottom of the ware is in vertical registry with the overhead burn-off chuck 85, as shown in FIG. 3. This marks the origin of the ware unloading station. At this time, the cam roller 78 engages the cam 82 (FIG. 6) to shift the unit 60 radially on its splined mounting 61b—67 (FIG. 11) by the bell-crank type linkage 77—75—74 biasing the spring 70. The path of the ware is then altered to retain the ware in registry with the chuck through the path B' (FIGS. 4 and 7). While the ware is moving in the path B', the chuck 85 lowers, and the ware-gripping jaws are actuated to their open position. To do this, a cam 84 is attached, as by bolts 84a to the stationary upper casting 24 at an elevation to engage rollers 119 as they move past it (FIGS. 3, 4, 8 and 9). As the jaws are opened by pivotal movement of lever 116, the ware is allowed to rest on the headplate 97b of its unit 60. After the unit progresses in its rotary movement past the unloading station, and the ware is transferred to a chuck 85 for carriage thereby, the cam 82 terminates to cause the unit 60 to extend again to travel in the circular path B. The cam 84 also terminates, which causes the jaws to close. Thereafter, the unit 60 is again rotated 180° to the upright position for picking up another article.

Having just described one form of the invention for transferring upright ware to inverted chucks, it will now become apparent, upon describing the next form of the invention, that it fulfills the purpose of a universal automatic ware loader. This, the second form of the invention, provides for transfer of ware from a conveyor 12 in the upright position to a chuck of a rotary burn-off machine in upright position, moving in its horizontal circular path, the same as before, but in underlying relationship to the bottom of the ware undergoing transfer.

Referring to FIG. 18, the loader 16 may be converted to this second form of operation by removing the annular gear plate 152 and the guide plates 148 and 149 from the previously described mechanism. This may be accomplished by removing the upper annular bearing plate 53 from the housing 52 after removing the bolts 53a (FIG. 4). The upper casting 24 may then be pulled and these parts 148, 149, and 152 removed by unscrewing the bolts 150. These parts are replaced by a one-piece annular bearing plate 157 which provides a bearing surface for the flats 147 of the sleeve member 63 of each unit 60 about the entire circle of the movement provided by the rotary turret. The bevel gear segments are thus omitted from the structure. This will retain the units in the same position without invert and revert, as contrasted to the practice under the first form of operation described earlier. The plate 157 is bolted in place at the same threaded holes but with appropriate bolts, such as indicated by 158. Since the units 60 will not now be inverted at the unloading station, a cam 159 is fastened at 160 on the base 20 to perform the function of opening the jaws of each unit for unloading. This cam is of similar contour and is peripherally located to serve substantially the same function as cam 84 did in opening the gripping jaws to release the ware. The cam roller 119 is shown in contact with the cam for this purpose. In this form of the invention, the burn-off chucks, here indicated as 161, are upright. They are loaded by raising them vertically on the rotary burn-off carriage to receive the bottom of the ware therein. The chuck should be nearly in fully raised position at the time the jaws release the ware. This will result in but a short drop for the ware into the chuck, but enough to clear the ware gripping jaws of the units 60 as the paths B and C diverge.

In all other respects, the loader and associated mechanisms are operated as previously described.

The showing in FIG. 19 illustrates the same means for controlling the horizontal path of the ware as it enters and travels on the rotary moving pick-up mechanisms 60 in the ware unloading station defining the altered path B' for retaining the ware in registry with the underlying burn-off chucks.

It will, of course, be understood that various details of construction may be modified through a wide range without departing from the principles of this invention, and it is not the purpose to limit the patent granted hereon otherwise than necessitated by the scope of the appended claims.

I claim:

1. The method of transferring an article of the class described having an upper, outwardly tapered moil portion and which is traveling in upright position on a horizontal conveyor, comprising moving the article to a ware receiving station along said conveyor, bringing a pair of gripping jaws to the receiving station, closing the jaws in a horizontal plane about the upper axially tapered moil portion of the article to engage the latter, continuing to close the jaws in said plane and in engagement with said tapered portion, whereby the article is moved upwardly with respect to the jaws and thereby elevated free of the conveyor for transfer, moving the article to a remote ware delivery station that is horizontally spaced from said ware receiving station, and opening the jaws at the ware delivery station, thereby releasing the article to a separate carrier for subsequent handling.

2. The method of transferring glassware articles of the class described having an upper, outwardly tapered moil portion and which are traveling in upright position on a horizontal conveyor, comprising moving the articles in seriatim fashion to a ware receiving station along said conveyor, bringing pairs of gripping jaws in succession at regular intervals to the receiving station, closing the jaws of each said pair about the upper axially tapered moil portion of one of the articles to engage the latter, continuing to close each pair of said jaws in engagement with said tapered moil portion whereby the articles are moved upwardly with respect to the jaws and lifted into engagement with an overhead horizontal plate for transferring each article and thereby freeing it from the conveyor, moving each of the articles to a remote ware delivery station that is horizontally spaced from said ware receiving station, and opening each of the pairs of jaws at said ware delivery station, thereby successively releasing the articles to a carrier for subsequent handling.

3. The method defined in claim 2, which includes elevating the articles by the conveyor as they reach the ware receiving station.

4. The method defined in claim 2, wherein the articles are inverted during their movement between the ware receiving station and the ware delivery station.

5. The method defined in claim 2, wherein the articles are synchronized in their movement to the ware receiving station with the pair of gripping jaws as the latter are brought to the receiving station.

6. The method defined in claim 2, wherein the articles are manipulated to register with the separate carrier as the articles are moved into the ware delivery station.

7. In a ware transfer device for transferring ware supported in an upright position at a ware loading station, said ware being formed with an uppermost moil having an annular end rim defining its open end and having a downwardly and inwardly tapered side wall below said rim, the combination of a turret rotatable about a vertical axis successively past said ware loading station and a ware unloading station, drive means connected for rotating said turret, plural ware holding means carried on said turret, each said means including a holder frame, a pair of ware gripping jaws mounted on said frame for movement toward and away from each other between open and closed positions about the tapered moil of the ware, said jaws each having an inner face adapted to engage the ware below its rim during closing, whereby said ware is moved upwardly with respect to the jaws by closing force of the jaws against its said tapered side wall, a horizontally disposed flat stop member on said holder frame arranged in spaced relation from said jaws and engageable with the rim of the ware as it is moved upwardly, thereby positioning the ware against said member, a driving connection to said pair of jaws for moving them between said open and closed positions, and cam means engageable with said driving connection during rotation of the turret, said cam means closing the jaws about said moil of the ware at the ware loading station to position the ware on said ware holding means and operating the jaws to release the ware for transfer at the unloading station.

8. The ware transfer device defined in claim 7, in combination with a multiple chuck burn-off machine driven so that its chucks travel in a circular path through the ware unloading station, the drive means for rotating the turret of the ware transfer device comprising a driving connection from the burn-off machine for moving the ware holding means in synchronized relation with said machine chucks, each ware holding means frame being radially slidably mounted on the turret, means including a cam follower connected for shifting the frame, and a cam engageable with the cam follower at the ware unloading station, the cam providing radial shifting movement of said ware holding means to register the ware carried by it with a burn-off machine chuck.

9. In a ware transfer device for transferring ware supported in an upright position at a ware loading station to a chuck of multiple chuck burn-off machine which moves through a ware unloading station, the combination of a base, a turret rotatable about a vertical central axis on said base past said ware loading and unloading stations, drive means connected for rotating said turret in synchronized relation to the movement of the chucks of the burn-off machine, a plurality of ware handling devices adapted for radially disposed carriage at equally spaced peripheral distances on said turret, each said device including a ware engaging member on its outer end operable for picking up ware and releasing same, a mounting shaft, a rotatable sleeve member journaled on said turret and mounting said shaft for radially shifting said device, the device being fastened to the sleeve member for rotation with it, a spring compressed between said device and its said sleeve member for normally holding said device radially extended in its sleeve member, a pinion on said sleeve member, and diametrically opposed flat faces on said sleeve member, complementary annular guide plates supported by said base, each having a horizontal bearing surface, one of the flat faces on each said sleeve member adapted to engage said plate to hold the device against rotation on the turret, said guide plates being constructed and arranged to provide first and second recessed regions on opposite sides of the ware unloading station whereat each said device is free to rotate, a first annular gear segment supported by said base and disposed along said first recessed region, a second annular gear segment supported by said base and disposed along said second recessed region, the teeth of said segments adapted to mesh with the teeth of each said pinion during rotation of the turret, said first gear segment imparting one-half revolution of rotation to each said device for inverting ware carried on said devices, and said second gear segment imparting one-half revolution of rotation to each said device for reverting it, a lever for each said device having a cam follower mounted on one end, and its other end operatively connected to said device for radially shifting the latter, a pivotal mounting for said lever on the turret, and a cam supported by said base and engageable with each said cam follower during movement of the latter operable in proximity to said ware unloading station for shifting each said device to register ware carried thereby with a chuck of the burn-off machine.

10. The ware transfer device defined in claim 18, wherein each said ware holding device comprises a frame fastened to the outer end of the mounting shaft, a horizontal headplate fastened to said frame, a pair of parallel shafts pivotally mounted on said frame and disposed perpendicular to said headplate, a pair of complementary ware gripping jaws, one mounted on each of the shafts for movement therewith, means normally rotating the shafts in opposite directions for pivoting said jaws toward each other to a closed position, meshing gears on the two shafts, a drivable member on each shaft, a lever pivotally mounted on the frame, a driver member engageable with either said drivable members and actuated by rotary movement of the lever, first and second cams supported on the base of the ware transfer device in proximity to the ware loading and unloading stations, respectively, a cam follower means on each said lever engageable with said first cam during rotation of the turret prior to the ware loading station and engageable with said second cam prior to the ware unloading station for rotating the lever and actuating its driver member to engage one of the drivable members and drive the shafts in opposite directions for pivoting the jaws away from each other to open position.

References Cited in the file of this patent

UNITED STATES PATENTS

| | | |
|---|---|---|
| 1,654,091 | Peiler | Dec. 27, 1927 |
| 2,259,728 | Bridges | Oct. 21, 1941 |
| 2,394,779 | Hunter | Feb. 12, 1946 |
| 2,415,997 | Eldred | Feb. 18, 1947 |
| 2,547,729 | Aiken | Apr. 3, 1951 |
| 2,599,221 | Bergmann | June 3, 1952 |
| 2,644,274 | Bailey | July 7, 1953 |
| 2,791,316 | Mullan | May 7, 1957 |
| 2,860,763 | Kohrs | Nov. 18, 1958 |
| 2,899,234 | Bornemann | Aug. 11, 1959 |
| 2,904,161 | Schreiber | Sept. 15, 1959 |
| 2,906,416 | Teo | Sept. 29, 1959 |

UNITED STATES PATENT OFFICE
CERTIFICATE OF CORRECTION

Patent No. 3,100,051                 August 6, 1963

Carl W. Schreiber

It is hereby certified that error appears in the above numbered patent requiring correction and that the said Letters Patent should read as corrected below.

Column 14, line 38, for the claim reference numeral "18" read -- 9 --.

Signed and sealed this 21st day of July 1964.

(SEAL)

Attest:

ESTON G. JOHNSON
Attesting Officer

EDWARD J. BRENNER
Commissioner of Patents